US011330758B2

(12) United States Patent
Borst et al.

(10) Patent No.: US 11,330,758 B2
(45) Date of Patent: May 17, 2022

(54) METHOD OF NEUTRALIZING COTTON SEEDS

(71) Applicant: BASF SE, Ludwigshafen am Rhein (DE)

(72) Inventors: Joseph P Borst, Plymouth, MI (US); Kenneth L Zack, Wyandotte, MI (US)

(73) Assignee: BASF SE, Ludwigshafen am Rhein (DE)

( * ) Notice: Subject to any disclaimer, the term of this patent is extended or adjusted under 35 U.S.C. 154(b) by 366 days.

(21) Appl. No.: 15/763,471

(22) PCT Filed: Sep. 27, 2016

(86) PCT No.: PCT/US2016/053920
§ 371 (c)(1),
(2) Date: Mar. 27, 2018

(87) PCT Pub. No.: WO2017/058765
PCT Pub. Date: Apr. 6, 2017

(65) Prior Publication Data
US 2018/0263172 A1    Sep. 20, 2018

Related U.S. Application Data

(60) Provisional application No. 62/233,826, filed on Sep. 28, 2015.

(51) Int. Cl.
*A01C 1/06* (2006.01)
*A01C 1/00* (2006.01)
*D01B 1/02* (2006.01)
*A01D 46/08* (2006.01)

(52) U.S. Cl.
CPC ............ *A01C 1/06* (2013.01); *A01C 1/00* (2013.01); *A01D 46/08* (2013.01); *D01B 1/02* (2013.01)

(58) Field of Classification Search
CPC .... A01C 1/00; A01C 1/06; A01C 1/08; D01C 1/00
USPC ........ 47/56, 57.6, 58.1 R, 58.1 SE; 504/100
See application file for complete search history.

(56) References Cited

U.S. PATENT DOCUMENTS

| | | | |
|---|---|---|---|
| 2,618,103 A | 11/1952 | Streets | |
| 2,646,268 A * | 7/1953 | Jackson | D01B 1/02 432/32 |
| 4,064,636 A * | 12/1977 | Downing | F26B 20/00 34/60 |
| 4,154,021 A * | 5/1979 | Griffith | D01B 1/04 19/41 |
| 4,216,616 A * | 8/1980 | Smith, Jr. | C11B 1/04 19/41 |
| 4,259,764 A | 4/1981 | Downing | |
| 4,343,070 A * | 8/1982 | Wade | D01B 1/04 19/40 |
| 4,371,449 A * | 2/1983 | Smith, Jr. | C11B 1/04 19/40 |
| 5,256,181 A * | 10/1993 | Manalastas | C05G 5/37 71/28 |
| 5,586,412 A * | 12/1996 | Wadlington | D01B 1/04 47/58.1 R |
| 5,750,466 A * | 5/1998 | Wedegaertner | A01C 1/06 504/100 |
| 6,531,629 B1 | 3/2003 | Eiermann et al. | |
| 8,436,210 B2 * | 5/2013 | Suga | A01N 37/18 554/36 |
| 9,963,802 B2 * | 5/2018 | Borst | A01N 25/00 |
| 2008/0161591 A1 | 7/2008 | Richards | |
| 2008/0293707 A1 | 11/2008 | Gewehr et al. | |
| 2016/0311758 A1 | 10/2016 | Capracotta et al. | |
| 2017/0037304 A1 | 2/2017 | Rimassa et al. | |
| 2017/0066995 A1 | 3/2017 | Borst et al. | |
| 2017/0073842 A1 | 3/2017 | Borst et al. | |

FOREIGN PATENT DOCUMENTS

| | | |
|---|---|---|
| CN | 1038741 A | 1/1990 |
| CN | 102177777 A | 9/2011 |
| CN | 103314673 A | 9/2013 |
| WO | 2015134496 A1 | 9/2015 |

OTHER PUBLICATIONS

Biradarpatil, et al., "Effect of dosages of sulphuric acid and duration of delinting on seed quality in desi cotton", Karnataka Journal of Agricultural Sciences, vol. 22, Issue 4, 2009, pp. 896-897.
Katherine D. Williams, "The germination and emergence response of polymer-coated fuzzy cottonseed", 2000, 64 pages.
International Search Report and Written Opinion for International Application No. PCT/US2016/053920, dated Dec. 23, 2016, 10 pages.

* cited by examiner

*Primary Examiner* — David J Parsley
(74) *Attorney, Agent, or Firm* — Armstrong Teasdale LLP

(57) ABSTRACT

Provided herein is a method of neutralizing cotton seeds, including the steps of providing delinted cotton seeds having a pH of less than about 3.3, and applying an alkyl amine to the delinted cotton seeds to produce neutralized delinted cotton seeds having a pH of greater than about 3.5.

17 Claims, No Drawings

METHOD OF NEUTRALIZING COTTON SEEDS

CROSS-REFERENCE TO RELATED APPLICATIONS

This application is the national stage entry of PCT/US2016/053920, filed on Sep. 27, 2016, which claims the benefit of priority to U.S. Provisional Patent Application No. 62/233,826, filed Sep. 28, 2015, which is incorporated by reference in its entirety herein.

FIELD OF THE INVENTION

The present disclosure generally relates to a method of neutralizing delinted cotton seeds, and to a composition for neutralizing delinted cotton seeds.

BACKGROUND

Ginning processes remove impurities and waste (e.g. burs, dirt, stems, leaf material, etc.) from harvested cotton and yield cotton and cotton seeds. The cotton is used in textile and other applications, and the cotton seed is used for planting or is processed into cottonseed oil, meal, and hulls. However, before use in planting, the cotton seed is typically delinted in a delinting process.

The delinting process is required because a cotton seed separated in the ginning process typically has a residual covering of cotton, i.e., lint, attached to a hull of the cotton seed. This lint interferes with subsequent handling, processing, grading, and planting of the cotton seed. Conventional delinting processes include mechanical delinting processes and flaming delinting processes which can be time-consuming and expensive and can even damage the cotton seed. Conventional delinting processes also include chemical delinting processes, especially when the intended use of the cotton seed is planting.

In a typical chemical delinting process, acid is applied to cotton seeds having lint thereon to 'degrade' the lint attached to the hulls. Conventional chemical delinting processes typically utilize acid, e.g. hydrochloric acid gas (HCl) or liquid sulfuric acid ($H_2SO_4$).

When acids are used in delinting processes, the pH of the cotton seeds can drop, i.e., the acidity of the seeds can increase. Such increases in acidity may reduce seed germination rate (the likelihood that each seed will grow into a cotton plant). Consequently, delinted seeds are often neutralized, e.g. treated with lime or calcium carbonate. That is, the seeds are treated to increase their pH, i.e., to reduce the acidity of the seeds. Such treatments often involve the application of powders, which can be messy and yield inconsistent results.

As such, there remains an opportunity to provide improved methods and compositions for neutralizing delinted cotton seeds.

SUMMARY

A method of neutralizing cotton seeds with an alkyl amine is disclosed. The method comprises the steps of providing delinted cotton seeds having a pH of less than about 3.3 and applying the alkyl amine to the delinted cotton seeds to produce neutralized delinted cotton seeds having a pH of greater than about 3.5.

The alkyl amine can be applied to delinted seeds in an efficient and cost effective manner to produce neutralized delinted cotton seeds having excellent germination rates.

DETAILED DESCRIPTION OF THE INVENTION

The present disclosure provides a composition for neutralizing cotton seeds (i.e., treating acid delinted cotton seeds to increase their pH/to reduce their acidity). The composition is particularly useful for replacing conventional neutralizing agents (e.g. calcium carbonate) traditionally used to neutralize cotton seeds.

The composition comprises an alkyl amine. In various embodiments, the composition consists essentially of, or consists of, one or more of the alkyl amine. In various other embodiments, the composition consists essentially of, or consists of, one or more of the alkyl amine and water. The terminology "consists essentially of" typically describes that the composition is free of compounds that would affect neutralization efficacy of the alkyl amine. In one embodiment of the present invention, the composition is a concentrate.

It is also contemplated herein that the composition can be supplied in two or more discreet components, which can be blended together prior to use. In this example, the two components can be provided separately and blended together on site at the location of use just prior to use and, if desired, diluted with water.

The composition comprises an alkyl amine. For purposes of the subject disclosure, an alkyl amine is defined as a molecule including one or more nitrogen atoms and one or more alkyl groups. An alkyl group is an alkane (a saturated hydrocarbon, i.e. a molecule including carbon and hydrogen atoms and no double or triple bonds) missing at least one hydrogen atom. The term alkyl is broadly defined to include numerous possible substitutions. An acyclic alkyl has the general formula $C_nH_{2n+1}$. A cycloalkyl is derived from a cycloalkane by removal of a hydrogen atom from a ring and has the general formula $C_nH_{2n-1}$.

The alkyl amine can also be referred to as an aliphatic amine. An aliphatic amine includes one or more nitrogen atoms which are not bonded to an aromatic group. In contrast to an aliphatic amine, an aromatic amine contains one or more nitrogen atoms which are bonded to an aromatic group. The aromatic ring of an aromatic amine can decrease the alkalinity of the amine, depending on its substituents.

In a preferred embodiment, the alkyl amine is a liquid at room temperature. Such liquid embodiments of the alkyl amine can be applied to delinted seeds in an efficient and cost effective manner to produce neutralized delinted cotton seeds having excellent germination rates. Such liquid embodiments of the alkyl amine stand in stark contrast to conventional neutralization agents which often involve the application of powders, which can be messy and yield inconsistent results.

In some embodiments, the alkyl amine is an alkanol amine, i.e., the alkvl amine is hydroxy functional. Alkanol amines are compounds that include both hydroxyl (—OH) and amino (—$NH_2$, —NHR, and —$NR_2$) groups on an alkane backbone. Some non-limiting examples of alkanol amines include ethanolamines, heptaminol, isoetarine, propanolamines, sphingosine, methanolamine, dimethylethanolamine, N-Methylethanolamine. For example, in a preferred embodiment, the alkyl amine is an alkanol amine-triethanolamine (TEOA).

The alkyl amine can be a primary amine, a secondary amine, or a tertiary amine. The alkyl amine can include one or more primary amines, secondary amines, tertiary amines, and combinations thereof. A primary amine for purposes of this disclosure is an alkyl amine which includes one or more nitrogen atoms in which one of three hydrogen atoms (present in ammonia) is replaced by an alkyl group. A secondary amine for purposes of this disclosure is an alkyl amine which includes one or more nitrogen atoms in which two of three hydrogen atoms (present in ammonia) are replaced by alkyl groups. A tertiary amine for purposes of this disclosure is an amine in which all three hydrogen atoms in ammonia are replaced by alkyl groups.

In some embodiments, the alkyl amine is a tertiary amine. Some non-limiting examples of tertiary amines include trimethylamine, triethylamine (TEA), triphenylamine, TEOA, and various embodiments of polyethyleneimine (PEI). For example, in a preferred embodiment the alkyl amine is TEOA. TEOA is a viscous organic compound that is both a tertiary amine and a triol.

In some embodiments, the alkyl amine includes a primary amine, a secondary amine, and a tertiary amine. For example, in one embodiment, the alkyl amine is a polyalkylene imine such as polyethylene imine (PEI).

The PEI can be made by various methods understood in the art. For example, the PEI can be made by ring opening polymerization of ethyleneimine. In certain embodiments, the PEI can be further modified, such as by amidation with fatty acids, by alkoxylation with alkylene oxides, or by carboxylation with acrylic acid and/or maleic acid.

In certain embodiments, the PEI has a weight average molecular weight ($M_w$) of from about 300 to about 2,000,000, alternatively from about 800 to about 1,000,000, alternatively from about 600,000 to about 750,000, alternatively from about 800 to about 25,000, g/mol. The PEI is typically water soluble. As such, in certain embodiments, the alkyl amine comprises from about 20 to about 99 parts by weight PEI, remainder water. In other embodiments, the tackifier component is PEI resin.

In certain embodiments, the PEI has a pH of from about 11 to about 12. The PEI can have a high charge density, such as from about 8 to about 16 meq/g TS.

In various other embodiments, the PEI is a linear polymer comprising units such as:

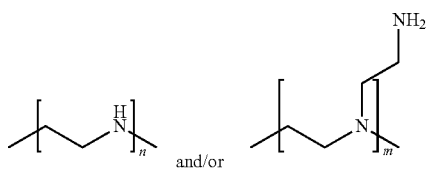

and/or wherein n is about 18 to about 50,000 such that the PEI has a weight average molecular weight of about 800 to about 2,150,000, g/mol. It is also contemplated that the PEI may have any value or range of values, both whole and fractional, within those ranges described above. In still other embodiments, the PEI has the following general structure:

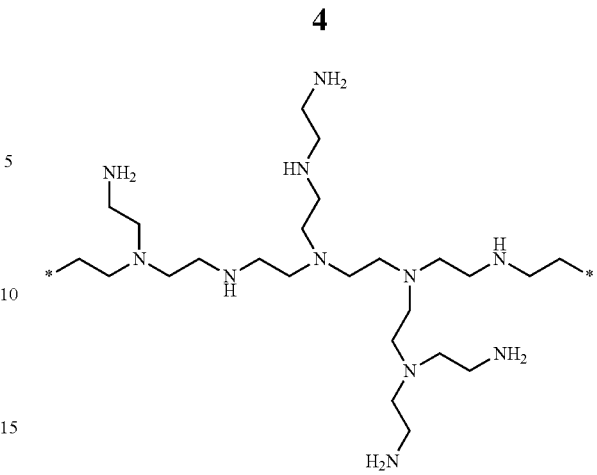

Table 1 below sets forth 3 exemplary PEI embodiments of alkyl amine. Of course, PEI may be mixed with water. The PEI embodiments of alkyl amine set forth in Table 1 are non-limiting embodiments and, thus, other PEI embodiments of alkyl amine with different physical characteristics are also contemplated.

TABLE 1

| Physical Characteristics | Non-Limiting Embodiment 1 of PEI | Non-Limiting Embodiment 2 of PEI | Non-Limiting Embodiment 3 of PEI |
|---|---|---|---|
| Appearance | Liquid | Liquid | Liquid |
| Approx. Viscosity at 20° C. (mPa · s) | 5,000 | 200,000 | 25,000 |
| Approx. Concentration in Water (wt %) | 98 | 99 | 50 |
| Approx. Water Content (wt %) | 2 | 1 | 50 |
| Approx. Pour Point (° C.) | 18 | 3 | 3 |
| Approx. Boiling Point (° C.) | >200 | >200 | 100 |
| Approx. Flame Point (° C.) | >100 | >100 | >100 |
| Approx. Density at 20° C. (g/cm³) | 1.03 | 1.10 | 1.09 |
| Approx. pH value (1% in Water) | 13 | 13 | 11 |
| Approx. pKa Value | 7-10 | 7-10 | 7-10 |
| Approx. Charge Density | 16 | 16 | 17 |
| Approx. Weight Average Molecular Weight ($M_w$) (g/mol) | 800 | 25,000 | 750,000 |
| Approx. Ratio of 1°:2°:3° Amines | 1/0.9/0.5 | 1/1.1/0.7 | 1/1/0.7 |

In various embodiments, the composition comprises PEI and has a solids (%) of from about 20 to about 99, % by weight based on the total weight of the mixture. In some embodiments the composition has a solids (%) of from about 20 to about 60, % by weight based on the total weight of the mixture. In other embodiments, the composition has a solids (%) of from about 90 to about 99, % by weight based on the total weight of the mixture.

In various embodiments, the composition comprises PEI and has a viscosity of from about 200 to about 200,000, mPa·sec at 23° C. In some embodiments the composition has a viscosity of from about 200 to about 25,000, mPa·sec at 23° C. In some embodiments the composition has a viscosity of from about 5,000 to about 35,000, mPa·sec at 23° C. In other embodiments, the composition has a viscosity of from about 400 to about 14,000, mPa·sec at 23° C.

Table 2 below sets forth 12 exemplary compositions comprising PEI. Of course, PEI may be mixed with water. The embodiments of the composition comprising PEI set forth in Table 2 are non-limiting embodiments and, thus, other composition embodiments with different PEI's and physical characteristics are also contemplated.

TABLE 2

| Composition | Solids (% by weight) | Viscosity at 23° C. (mPa · sec) | $M_w$ (g/mol) |
| --- | --- | --- | --- |
| Example Composition A | 99 | 5,000 | 800 |
| Example Composition B | 99 | 8,000 | 1,300 |
| Example Composition C | 99 | 14,000 | 2,000 |
| Example Composition D | 99 | >200,000 | 25,000 |
| Example Composition E | 50 | 500 | 800 |
| Example Composition F | 50 | 400 | 1,300 |
| Example Composition G | 50 | 600 | 2,000 |
| Example Composition H | 50 | 1,100 | 5,000 |
| Example Composition I | 56 | 11,000 | 25,000 |
| Example Composition J | 50 | 25,000 | 750,000 |
| Example Composition K | 33 | 1,700 | 750,000 |
| Example Composition L | 24 | 700 | 2,000,000 |

Suitable PEI is commercially available from BASF Corporation under the trade name of LUPASOL®.

In addition to the alkyl amine (e.g. PEI), the composition may include water. This water may be the same as, or independent from, the water described immediately above which is mixed with the PEI. The water can be of various types. In certain embodiments, the water is de-mineralized and/or de-ionized. The water is present in the composition in various amounts, depending on the embodiment. The water can be added to the composition as a separate component. The composition can be provided as a concentrate and diluted in situ at the site at which the cotton seeds are neutralized.

In many embodiments, the treatment includes a seed treatment. Seed treatments are known in the art and are generally a mixture a various components such as fungicides, nematicides, pigments, and solvents. The purpose of the seed treatment is to improve the germination rate of the neutralized delinted cotton seeds.

In certain embodiments, when water is included in the composition, water is present in the composition in an amount of at least about 10, alternatively at least about 20, alternatively at least about 30, alternatively at least about 40, alternatively at least about 50, alternatively at least about 60, alternatively at least about 70, alternatively at least about 80, alternatively at least about 90, alternatively from about 50 to about 90, alternatively from about 60 to about 80, parts by weight based on 100 parts by weight of the composition. The amount of water present in the composition may vary outside of the ranges above, but is typically both whole and fractional values within these ranges.

The composition may also include one or more surfactants. If employed, the surfactant is typically selected from the group of nonionic surfactants, anionic surfactants, cationic surfactants, amphoteric surfactants, and combinations thereof.

In various embodiments, the composition includes a non-ionic surfactant. Non-ionic surfactants, suitable for purposes of the present disclosure, include alcohol alkoxylates. Suitable alcohol alkoxylates include linear alcohol ethoxylates. Additional alcohol alkoxylates include alkylphenol ethoxylates, branched alcohol ethoxylates, secondary alcohol ethoxylates, castor oil ethoxylates, alkylamine ethoxylates (also known as alkoxylated alkyl amines), tallow amine ethoxylates, fatty acid ethoxylates, sorbital oleate ethoxylates, end-capped ethoxylates, or combinations thereof. Further non-ionic surfactants include amides such as fatty alkanolamides, alkyldiethanolamides, coconut diethanolamide, lauramide diethanolamide, cocoamide diethanolamide, polyethylene glycol cocoamide, oleic diethanolamide, or combinations thereof. Yet further non-ionic surfactants include polyalkoxylated aliphatic base, polyalkoxylated amide, glycol esters, glycerol esters, amine oxides, phosphate esters, alcohol phosphate, fatty triglycerides, fatty triglyceride esters, alkyl ether phosphate, alkyl esters, alkyl phenol ethoxylate phosphate esters, alkyl polysaccharides, block copolymers, alkyl polyglucocides, or combinations thereof.

Suitable surfactants are commercially available from BASF Corporation under the trade names of PLURAFAC®, PLURONIC®, TETRONIC®, LUTROPUR®, and LUTENSOL®.

In various embodiments, the composition includes an amphoteric surfactant. Amphoteric surfactants, suitable for purposes of the present disclosure, include betaines, imidazolines, and propionates. Further examples of suitable amphoteric surfactants include sultaines, amphopropionates, amphrodipropionates, aminopropionates, aminodipropionates, amphoacetates, amphodiacetates, and amphohydroxypropylsulfonates. In certain embodiments, the amphoteric surfactant is at least one of a propionate or an amphodiacetate. Further specific examples of suitable amphoteric surfactants include N-acylamino acids such as N-alkylaminoacetates and disodium cocoamphodiacetate, and amine oxides such as stearamine oxide. In one embodiment, the amphoteric surfactant comprises disodium cocoamphodiacetate.

In certain embodiments, the amphoteric surfactant is illustrated by the formulas: $RCH_2NHCH_2CH_2COOM$ or $RCH_2N(CH_2CH_2COOM)_2$, wherein M is a salt-forming cation (e.g. Na or H) and R is the hydrocarbon moiety of the long-chain fatty acid RCOOH, e.g. a $C_7$ to $C_{35}$, or a $C_7$ to $C_{18}$, fatty acid. Such amphoteric surfactants include sodium N-coco-β-aminopropionate, N-coco-β amino propionic acid; N-lauryl, myristyl-β-amino propionic acid; disodium N-tallow-β-iminopropionate; disodium N-lauryl-β-iminopropionate (also known as sodium lauriminodipropionate); and the partial sodium salt of N-lauryl-β-iminopropionic acid. In one embodiment, the amphoteric surfactant comprises sodium lauriminodipropionate. Suitable amphoteric surfactants are commercially available from BASF Corporation, under the trade names of DERIPHAT®, MAFO®, and DEHYTON®.

The composition may also include one or more corrosion inhibitors. A corrosion inhibitor may be defined, in general terms, as a substance that, when added to the composition, reduces the corrosion rate of a metal exposed to the composition. To this end, the corrosion inhibitor is useful for inhibiting corrosion of the surface of the equipment used in the neutralization process.

In one embodiment, the composition comprises an amphoteric surfactant which acts as both a corrosion inhibitor and a surfactant. Suitable corrosion inhibitors are commercially available from BASF Corporation under the trade names of KORANTIN®, GOLPANOL®, and LUGALVAN®.

The composition may also include one or more defoamers. Examples of suitable defoamers include silicone based defoamers and non-ionic block copolymers. Suitable defoamers are commercially available from Dow Corning Corporation of Midland, Mich., under the trade name ANTI-FOAM®, and FOAM BAN®.

In certain embodiments, the composition further comprises one or more additives. Various types of additives can be used. Examples of suitable additives include antioxidants, chelants, colorants, dispersants, stabilizers, viscosity modifiers, and combinations thereof. If utilized, the additive(s) may be used in various amounts.

The composition typically has a pH of from about 6 to about 12, alternatively from about 7 to about 12, alternatively from about 7 to about 11. The pH of the composition is impacted by the type and amount of components employed to form the composition. For example, if the composition is diluted with water, the pH will generally decrease.

The present disclosure also provides a method of neutralizing cotton seeds with the alkyl amine. The method comprises the steps of providing delinted cotton seeds having a pH of less than about 3.3 and applying the alkyl amine to the delinted cotton seeds to produce neutralized delinted cotton seeds having a pH of greater than about 3.5.

As is alluded to above, the delinted cotton seeds are typically delinted via an acid delinting process. As such, the delinted cotton seeds are acidic. The delinted cotton seeds, prior to neutralization, typically have a pH of less than about 3.3, alternatively less than about 3.2, alternatively less than about 3.1, alternatively less than about 3.0, alternatively less than about 2.9, alternatively less than about 2.8, alternatively less than about 2.7, alternatively less than about 2.6, alternatively less than about 2.5.

The steps of the method can be conducted in-line, as part of a continuous process, or as part of a delinting process. Alternatively, the steps can be conducted discretely, one step at a time, with various amounts of time between each step. Typically, the steps of the method are conducted in-line. The steps of the method can be conducted with/in multiple vessels, conveyors, etc. Alternatively, the entire method can be conducted in a single vessel.

In one embodiment, the alkyl amine (as is described above) is applied to the surfaces of delinted cotton seeds as part of the composition set forth above. The method is particularly useful for replacing conventional neutralizing agents (e.g. calcium carbonate) traditionally used to neutralize cotton seeds.

The alkyl amine (or in some embodiments, the composition) can be applied to the surface of the delinted cotton seeds by various methods, such as by applying the alkyl amine to the surface (e.g. by dipping the delinted cotton seeds in the alkyl amine), spraying the alkyl amine onto the delinted cotton seeds surface, etc. Various application apparatuses understood in the art can be employed, such as a spraying apparatus, a dip tank, etc. In a preferred embodiment, the alkyl amine is sprayed on the delinted cotton seeds. In yet another preferred embodiment, the delinted cotton seed is soaked in the alkvl amine. Of course, in one embodiment, the step of applying the alkyl amine to the surface of delinted cotton seeds is further defined as applying the composition described above, which comprises the alkyl amine, the surfactant, and water, to the surface of delinted cotton seeds.

Further, it should be appreciated that the alkyl amine (or in some embodiments, the composition) can be applied to the surface of the delinted cotton seeds in a single step or in multiple sub-steps. For example, when the alkyl amine (or in some embodiments, the composition) is applied to the surface of the delinted cotton seeds via spraying, the delinted cotton seeds can be sprayed with the alkyl amine a first time, and then sprayed with the with the alkyl amine a second time, with various intermediate steps contemplated as well, such as aging, heating, etc. As another example, the alkyl amine can be first applied to the surface of the delinted cotton seeds via mixing the delinted cotton seeds with the alkyl amine in a dip/mix tank and then applied a second time via spraying the alkyl amine on the delinted cotton seeds, or vice versa.

In some embodiments, the alkyl amine is applied to the surface of the delinted cotton seeds in an amount of from about 0.01 to about 5, alternatively from about 0.01 to about 2, alternatively from about 0.1 to about 2, alternatively from about 0.1 to about 1, alternatively from about 0.1 to about 0.9, alternatively from about 0.2 to about 0.9, parts by weight actives based on 100 parts by weight of the delinted cotton seeds. Obviously, the amount applied can vary outside of the ranges above depending on the concentration of the alkyl amine applied.

In some embodiments, the alkyl amine is applied to the surface of the delinted cotton seeds in an amount of equal to or less than about 1, alternatively less than about 0.9, alternatively less than about 0.5, parts by weight based on 100 parts by weight of the delinted cotton seeds.

Alternatively, the alkyl amine (or in some embodiments the composition) is applied to the surface of the delinted cotton seeds in an amount sufficient to adjust the pH of the surface of the delinted cotton seed to a pH of from about 3.5 to about 7, alternatively from about 4 to about 6, alternatively from about 4.5 to about 5.5, alternatively about 5.

The method may also include the step of agitating the delinted cotton seeds having the alkyl amine applied thereto to produce the neutralized delinted cotton seeds. The step of agitating is conducted simultaneous with and/or subsequent to the step of applying the alkyl amine. Agitation can be accomplished with various methods, such as by exposing the delinted cotton seeds having the alkyl amine applied thereto to blown air, tumbling the delinted cotton seeds having the alkyl amine applied thereto in a rotating and/or vibrating vessel, etc. Various application apparatuses understood in the art can be employed to agitate the delinted cotton seeds having the alkyl amine applied thereto. In a preferred embodiment, the delinted cotton seeds having the alkyl amine applied thereto are mixed in a rotating vessel, such as a baffled drum.

Various embodiments of the method set forth are free of the use of calcium carbonate. That is, the composition and all method steps do not utilize calcium carbonate to neutralize the delinted cotton seeds.

Various embodiments of the method include the step of delinting the cotton seeds with an alkanesulfonic acid such as methanesulfonic acid (MSA). Of course, the step of delinting the cotton seed produces the delinted cotton seeds and is thus conducted prior to the steps of applying an alkyl amine to surfaces of delinted cotton seeds, and agitating the delinted cotton seeds having the alkyl amine applied thereto to produce the neutralized delinted cotton seeds.

The alkanesulfonic acid can be a short chain alkanesulfonic acid, such as one containing from about 1 to about 4 carbon atoms (e.g. one having propyl, ethyl, or methyl moieties). In one embodiment, the alkanesulfonic acid is para-toluene sulfonic acid. In another embodiment, the alkanesulfonic acid is isethionic acid or 2-hydroxyethanesulfonic acid. In a preferred embodiment, the alkanesulfonic acid is MSA.

Non-limiting examples of suitable alkanesulfonic acids, for purposes of the present disclosure, are commercially available from BASF Corporation of Florham Park, N.J.

under the trade name LUTROPUR®, such as LUTROPUR® MSA and LUTROPUR® MSA 100. In certain embodiments, the MSA is one which is formed by an air oxidation process, rather than from a chlorooxidation process. As such, the MSA has less metal content, such as less than 1 mg/kg, and little to no chloro compounds, which are generally corrosive. Other non-limiting examples of suitable alkanesulfonic acids are described in U.S. Pat. No. 6,531,629 to Eiermann et al. and in U.S. Pat. App. Pub. No. 2008/0161591 to Richards, the disclosures of which are incorporated herein by reference in their entirety to the extent they do not conflict with the general scope of the present disclosure.

In a preferred embodiment, the alkanesulfonic acid comprises the MSA. The MSA is a strong organic acid that is believed to be completely non-oxidizing and thermally stable. In addition, MSA has a low vapor pressure, has no odor, and is biodegradable. As such, the MSA is easy to handle and environmentally friendly, especially in comparison to strong acids known in the art such as sulfuric acid, nitric acid, and hydrochloric acid.

The step of delinting the cotton seeds, e.g. with an alkanesulfonic acid, typically yields delinted cotton seeds having pH of less than about 3.5, alternatively less than about 3.3, alternatively less than about 3.1. The steps of applying an alkyl amine to surfaces of the delinted cotton seeds, and agitating the delinted cotton seeds having the alkyl amine applied thereto to produce the neutralized delinted cotton seeds typically yields neutralized delinted cotton seeds having a final pH of greater than about 3.5, alternatively greater than about 4.5, alternatively from about 3 to about 7, alternatively from about 3.5 to about 6, alternatively from about 4 to about 6, alternatively from about 4.5 to about 5.5, alternatively about 5.

To test pH, a water solution is obtained from the addition of 50 g delinted cotton seeds mixed with 100 mL of deionized water and the pH of the water solution is measured in accordance with pH testing procedures known in the art. That is, the pH is obtained from a delinted cotton seed deionized water mixture having a weight (g, cotton seed) to volume (mL, water) ratio of 1 to 2.

Further, the method typically yields neutralized delinted cotton seeds having excellent germination rates at warm and cool temperatures.

To test seed germination rate in a "Cool Germination Test," a Petri dish is lined with a piece of GE 181 Seed Testing Paper, 15 delinted cotton seeds are placed on the filter paper, another sheet of the filter paper is placed on top of the delinted cotton seeds (forming a "seed sandwich"), and the seed sandwich is wet with 6 grams of boiled tap water. The Petri dish and its contents are then incubated at 18.3° C. (65° F.) for 7 days. After 7 days, the seeds are examined for germination and viability by hypocotyl and radical development. If hypocotyl and radical development occurs, the seed is deemed to have germinated. The method typically yields neutralized delinted cotton seeds having a germination rate at 18.3° C. (65° F.) of greater than about 65%, alternatively greater than about 75%, alternatively greater than about 85%, when tested via the Cool Germination Test.

To test seed germination rate in a "Warm Germination Test," a Petri dish is lined with a piece of GE 181 Seed Testing Paper, 15 delinted cotton seeds are placed on the filter paper, another sheet of the filter paper is placed on top of the delinted cotton seeds (forming a "seed sandwich"), and the seed sandwich is wet with 6 grams of boiled tap water. The Petri dish and its contents are then incubated at 29.4° C. (85° F.) for 2 days. After 2 days (48 hours) and after 3 days (72 hours) the seeds are examined for germination and viability by hypocotyl and radical development. If hypocotyl and radical development occurs, the seed is deemed to have germinated. The method typically yields neutralized delinted cotton seeds having a germination rate at 29.4° C. (85° F.) of greater than about 65%, alternatively greater than about 75%, alternatively greater than about 85%, when tested via the Warm Germination Test.

The following examples, illustrating the composition and method of the present disclosure, are intended to illustrate and not to limit the disclosure.

EXAMPLES

Examples 1-4 are lab-scale neutralizing experiments. The delinted cotton seeds used in Examples 1-4 are delinted with MSA based on the test method disclosed in Kamataka J. Agric. Sci. 22(4): (896-897) 2009 (100 mL MSA per kg of linted seed.)

Examples 1-4 are formed according to the method of the subject application. In accordance with Table 3 below, the compositions of Examples 1-4 are formed by blending a neutralizing agent and a seed treatment. In accordance with the method of the subject application, the compositions of Examples 1-4 are mixed with delinted seeds and stirred by hand for 5 minutes at room temperature to form neutralized delinted cotton seeds. Likewise, the composition of Comparative Example 1 is formed by blending calcium carbonate and a seed treatment. The composition of Comparative Example 1 is mixed with delinted seeds and stirred by hand for 5 minutes at room temperature to form neutralized delinted cotton seeds. The compositions and amounts of Examples 1-4 and Comparative Example 1 are set forth in Table 3 below. Further, the storage stability (tested via Turbiscan LAB AGS), neutralization efficacy (i.e. neutralized seed pH), and germination rate, are also set forth in Table 3 below.

TABLE 3

| Example ID | Comparative Example 1 | Example 1 | Example 2 | Example 3 | Example 4 |
|---|---|---|---|---|---|
| Neutralizing Agent | Calcium Carbonate | PE1 (800 g/mol) | PET (25,000 g/mol) | PET (750,000 g/mol) | TEOA |
| Weight of Neutralizing Agent (g) | 0.3 | 0.44 | 0.49 | 0.48 | 0.88 |
| Weight of Seed Treatment (g)* | 3.15 | 3.16 | 3.15 | 3.15 | 3.15 |
| Weight of Composition (g) (Total Weight of Seed Treatment & Neut. Agent) | 3.45 | 3.6 | 3.64 | 4.16 | 4.03 |
| Turbiscan Data Time to Failure 0.75 TSI** | 15 hours 37 minutes 54 seconds | >7 days | Not Performed | >7 days | >7 days |
| pH of Seed Treatment + Neutralizing Agent | 6.9 | 10.8 | 10.6 | 10.4 | 9.6 |
| Neutralized Seed pH (after treatment)*** | 4.4 | 4.4 | 4.5 | 4.6 | 4.5 |

TABLE 3-continued

| Example ID | Comparative Example 1 | Example 1 | Example 2 | Example 3 | Example 4 |
|---|---|---|---|---|---|
| Cool Germination Rate (%) 18.3° C. (65° F.) | 63% | 87% | 80% | 97% | 70% |

*Seed treatments are known in the art and typically comprise a mixture of various components such as fungicides, nematicides, pigments, and solvents. The seed treatment utilized was the same for all examples and comparative examples.
**Time to failure based on attaining a Turbiscan Stability Index of 0.75 as determined by the Turbiscan LAB AGS.
***Treatment amount is Weight of Neutralizing Agent (g) per 100 g delinted seeds.

Turbiscan measurements were conducted on a Turbiscan LAB AGS. Referring now to Table 3, Turbiscan measurements indicate that the alkyl amine stabilizes (e.g. reduces phase separation and precipitation) the seed treatment used to treat the delinted seed to improve seed germination rate. It is believed that the stability provided facilitates even wet out and thus facilitates the efficacy of neutralization and improves the germination rate of the neutralized seeds. The Turbiscan measurements indicate that compositions of Examples 1, 3, and 4 (which include the seed treatment and the alkyl amine) are stable for a longer period of time than the seed treatment control (alone) or the composition of Comparative Example 1 (which includes both the seed treatment and calcium carbonate).

To test pH, a water solution is obtained from the addition of 50 g delinted cotton seeds mixed with 100 mL of deionized water and the pH of the water solution is measured in accordance with pH testing procedures known in the art. That is, the pH is obtained from a delinted cotton seed deionized water mixture having a weight (g, cotton seed) to volume (mL, water) ratio of 1 to 2. The neutralized seed pH of Examples 1-4 is the same as or greater than the neutralized seed pH of Comparative Example 1.

To test seed germination rate in a "Cool Germination Test," a Petri dish is lined with a piece of GE 181 Seed Testing Paper, 15 delinted cotton seeds are placed on the filter paper, another sheet of the filter paper is placed on top of the delinted cotton seeds (forming a "seed sandwich"), and the seed sandwich is wet with 6 grams of boiled tap water. The Petri dish and its contents are then incubated at 18.3° C. (65° F.) for 7 days. After 7 days, the seeds are examined for germination and viability by hypocotyl and radical development. If hypocotyl and radical development occurs, the seed is deemed to have germinated. The method typically yields neutralized delinted cotton seeds having a germination rate at 18.3° C. (65° F.) of greater than about 65%, alternatively greater than about 75%, alternatively greater than about 85%, when tested via the Cool Germination Test. Generally, the higher the germination rate, the better. The germination rate of the neutralized seeds of Examples 1-4 is significantly higher than the germination rate of Comparative Example 1. The germination rate of Examples 1-3, which utilize PEI as an alkyl amine, are excellent—all over 80%. The germination rate results set forth suggest that the subject method yields higher germination rates and/or higher seed viability over time.

It is to be understood that the appended claims are not limited to express any particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present disclosure has been described herein in an illustrative manner, and it is to be understood that the terminology which has been used is intended to be in the nature of words of description rather than of limitation. Many modifications and variations of the present disclosure are possible in light of the above teachings. The present disclosure may be practiced otherwise than as specifically described within the scope of the appended claims.

What is claimed is:

1. A method of neutralizing cotton seeds, said method comprising the steps of:
    providing delinted cotton seeds having a pH of less than 3.3; and
    applying an alkyl amine to the delinted cotton seeds to produce neutralized delinted cotton seeds, wherein the alkyl amine is a liquid at room temperature, wherein the neutralized delinted cotton seeds have a final pH of from 4 to 6, wherein the alkyl amine comprises a tertiary amine comprising three alkyl groups selected from the group consisting of trimethylamine, triethylamine (TEA), polyethyleneimine (PEI), and combinations thereof.

2. The method as set forth in claim 1, further comprising a step of agitating the delinted cotton seeds having the alkyl amine applied thereto.

3. The method as set forth in claim 1, wherein the step of applying the alkyl amine comprises applying the alkyl amine in an amount of from about 0.01 to about 2 parts by weight based on 100 parts by weight of the delinted cotton seeds.

4. The method as set forth in claim 1, wherein the alkyl amine comprises an alkyl amine that is hydroxy functional.

5. The method as set forth in claim 1, wherein the alkyl amine comprises triethanol amine (TEOA).

6. The method as set forth in claim 1, wherein the alkyl amine comprises a primary amine, a secondary amine, and a tertiary amine.

7. The method as set forth in claim 1, wherein the alkyl amine comprises a polyalkylene imine.

8. The method as set forth in claim 1, wherein the alkyl amine comprises a polyethylene imine (PEI) having a weight average molecular weight (Mw) of from about 300 to about 2,000,000 (g/mol).

9. The method as set forth in claim 8, wherein the PEI is further modified via at least one of amidation with fatty acids, alkoxylation with alkylene oxides, and carboxylation with at least one of acrylic acid and maleic acid.

10. The method as set forth in claim 1, wherein the step of applying comprises applying a neutralizing composition comprising the alkyl amine, water, and a seed treatment to the delinted cotton seeds.

11. The method as set forth in claim 1, wherein the delinted cotton seeds are cotton seeds delinted with an alkanesulfonic acid.

12. The method as set forth in claim 11, wherein the alkanesulfonic acid is methanesulfonic acid (MSA).

13. The method as set forth in claim 1, wherein the step of applying the alkyl amine to the delinted cotton seeds comprises spray applying the alkyl amine on surfaces of the delinted cotton seeds.

14. The method as set forth in claim 2, wherein the step of agitating the delinted cotton seeds having the alkyl amine applied thereto comprises mixing the delinted cotton seeds and the alkyl amine in a rotating vessel.

15. The method as set forth in claim 2, wherein the steps of applying and agitating are conducted simultaneously.

16. The method as set forth in claim 1, wherein the delinted cotton seeds have an initial pH of less than 3.0.

17. The method as set forth in claim 1, wherein the neutralized delinted cotton seeds have a germination rate of greater than 65% when incubated at 18.3° C. (65° F.) for 7 days.

* * * * *